US006985502B2

(12) United States Patent
Bunton

(10) Patent No.: US 6,985,502 B2
(45) Date of Patent: Jan. 10, 2006

(54) TIME-DIVISION MULTIPLEXED LINK FOR USE IN A SERVICE AREA NETWORK

(75) Inventor: William P. Bunton, Pflugerville, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 957 days.

(21) Appl. No.: 09/989,911

(22) Filed: Nov. 19, 2001

(65) Prior Publication Data

US 2003/0099260 A1 May 29, 2003

(51) Int. Cl.
*H04J 3/04* (2006.01)
(52) U.S. Cl. ...................... 370/535; 370/360
(58) Field of Classification Search ........... 370/535, 370/360; 379/350, 329, 247, 164, 267, 384, 379/346
See application file for complete search history.

(56) References Cited

U.S. PATENT DOCUMENTS 5,471,525 A * 11/1995 Domoto et al. ............ 379/247
6,904,110 B2 * 6/2005 Trans et al. ................ 375/350
2003/0103253 A1 * 6/2003 Bunton ....................... 359/123

OTHER PUBLICATIONS

InfiniBand[SM] Trade Association, "InfiniBand™ Architecture Specification vol. 1", Jun. 19, 2001, pp. 1-194.
InfiniBand[SM] Trade Association, "InfiniBand™ Architecture Specification vol. 2", Jun. 19, 2001, pp. 1-131, and 180-224.

* cited by examiner

*Primary Examiner*—Chi Pham
*Assistant Examiner*—Prenell Jones

(57) ABSTRACT

A data transmission system uses a method of aligning a plurality of transmission lanes with a plurality of reception lanes in a time-division multiplexing arrangement. The method utilizes a plurality of control symbols and lane identifiers that are transmitted on each of the transmission lanes during link initialization and training. The control symbols and lane identifiers are time-division multiplexed onto a data link and subsequently demultiplexed onto the plurality of reception lanes. One of the reception lanes is monitored for receipt of a control symbol followed by a lane identifier. Upon receipt, a lane identifier is compared to the identity of the reception lane being monitored. If the received lane identifier does not match the identity of the reception lane being monitored, the assignment of the reception lanes is rotated.

23 Claims, 12 Drawing Sheets

TS1 ordered set

| | | | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|
| COM | COM | COM | COM | 00 | 01 | 02 | 04 | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |
| 4A | 4A | 4A | 4A | | | | | | | | | | | | | | | | |

TS2 ordered set

| COM | COM | COM | COM |
|---|---|---|---|
| 00 | 01 | 02 | 04 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |
| 45 | 45 | 45 | 45 |

SKIP ordered set

| COM | COM | COM | COM |
|---|---|---|---|
| SKP | SKP | SKP | SKP |
| SKP | SKP | SKP | SKP |
| SKP | SKP | SKP | SKP |

Skip Control Symbols
Lane Number Data
TS1 Data

FIG. 6

TIME-DIVISION MULTIPLEXED LINK FOR USE IN A SERVICE AREA NETWORK

REFERENCE TO RELATED APPLICATIONS

This application is related to U.S. patent application Ser. No. 09/989,897 entitled "Time-Division And Wave-Division Multiplexed Link For Use In A Service Area Network" filed on the same day as the current application.

BACKGROUND OF THE INVENTION

The invention relates generally to a multiplexing scheme in a network that joins a number of nodes. More particularly, but not exclusively, the invention relates to a multiplexing scheme in a System Area Network for connecting processor nodes and I/O nodes.

One example of a System Area Network (SAN) is that proposed by the Infiniband™ (IB) Trade Association. The IB SAN is used for connecting multiple, independent processor platforms (i.e., host processor nodes), input/output (I/O) platforms, and I/O devices. The IB SAN supports both I/O and interprocessor communications for one or more computer systems. An IB system can range from a small server with one processor and a few I/O devices, to a parallel installation with hundreds of processors and thousands of I/O devices. Furthermore, the IB SAN allows bridging to an internet, intranet, or connection to remote computer systems. IB provides a switched communications fabric allowing many devices to concurrently communicate with high bandwidth and low latency. An end node can communicate over multiple IB ports and can utilize multiple paths through the IB fabric. The multiplicity of IBA ports and paths through the network are exploited for both fault tolerance and increased data transfer bandwidth. IB hardware off-loads from the central processing unit much of overhead associated with the I/O communications operation. In an IB SAN, the data itself is carried between nodes on 1, 4 or 12 physical links.

Another example of a SAN is the Servernet™ processor and I/O interconnect by Compaq Computer Corporation.

SUMMARY OF THE INVENTION

According to one aspect of the invention there is provided a method of aligning a plurality of transmission lanes with a plurality of reception lanes in a data transmission system, the method comprising:
transmitting a plurality of control symbols and lane identifiers on each of the transmission lanes;
time-division multiplexing the control symbols and lane identifiers onto a data link;
demultiplexing the control symbols and lane identifiers onto the plurality of reception lanes;
monitoring one of the reception lanes for a control symbol;
upon receipt of a control symbol, awaiting receipt of a lane identifier;
upon receipt of a lane identifier, comparing the received lane identifier with the identity of the reception lane being monitored; and
rotating a lane assignment if the received lane identifier does not match the identity of the reception lane being monitored.

The method may further comprise incrementing a bad lane identifier if the received lane identifier does not match the identity of the reception lane being scanned. In such a case, the step of rotating the lane assignment is conducted only if the bad lane identifier reaches a predetermined number. After rotation, the bad lane identifier is then reset.

According to another aspect of the invention there is provided a method of aligning a plurality of transmission lanes with a plurality of reception lanes in a data transmission system, comprising
conducting link intialization or error recovery at a protocol-aware higher level of the architecture of the data transmission system, the link initialization or error recovery including the transmission of a plurality of ordered sets, at least one of the ordered sets including lane identifiers;
conducting link alignment at a protocol-unaware lower level in the architecture of the data transmission system, wherein the link alignment comprises the steps of:
receiving an ordered set on the plurality of reception lanes, the ordered set being transmitted by the protocol-aware higher level in accordance with a protocol associated with the higher level;
comparing a received lane identifier associated with the ordered set with an identity of a reception lane; and
rotating a lane assignment if the identity of the reception lane does not match the received lane identifier.

Still further, according to another aspect of the invention there is provided a method of conducting lane alignment comprising the steps of:
transmitting data on a plurality of transmission lanes by byte-striping the data across the transmission lanes;
time-division multiplexing the byte-striped data on the transmission lanes onto a data link;
transmitting a set of control symbols and lane identifiers in parallel on the transmission lanes;
time-division multiplexing the control symbols and lane identifiers on the transmission lanes onto the data link;
demultiplexing the time-division multiplexed byte-striped data onto a plurality of reception lanes;
demultiplexing the time-division multiplexed control symbols and lane identifiers onto the reception lanes;
monitoring one of the reception lanes for a control symbol and lane identifier;
comparing a received lane identifier with an identity of the lane being monitored; and
rotating a lane assignment if the lane identifier does not match the identity of the lane being monitored.

Yet further according to the invention there is provided a computer network device comprising:
a plurality of time-division multiplexers to generate a plurality of transmitted time-division multiplexed signals;
a plurality of time-division demultiplexers to demultiplex a plurality of received time division multiplexed signals onto a plurality of sets of receive lanes; and
a control module for monitoring a receive lane, the control module in use:
monitoring the monitored receive lane for receipt of a lane identifier;
comparing a received lane identifier with an identity of the monitored receive lane; and
rotating a lane assignment within the set of receive lanes that includes the monitored lane if the received lane identifier does not match the identity of the monitored receive lane.

According to another aspect of the invention, the control module increments a bad lane identifier if the received lane identifier does not match the identity of the monitored receive lane; and the rotation of the lane assignment is conducted only if the bad lane identifier reaches a predetermined value. In such a case, the control module resets the bad lane identifier after rotating the lane assignment or returns to monitoring the monitored receive lane without rotating the lane assignment if, after incrementing, the bad lane identifier has not reached the predetermined value.

In yet another aspect, the plurality of time-division multiplexers in use receive data that is byte streamed and control and identifier symbols that are transmitted in parallel, and the plurality of time-division multiplexers conduct time-division multiplexing at a bit level.

Still further, the control module may operate at a protocol-unaware level of the computer network device, and the control and lane identifier symbols are transmitted by a protocol-aware level of the computer network device. The protocol-aware level of the computer device may operate on an Infiniband protocol. Also, a plurality of ordered sets may be transmitted by the protocol-aware level upon link initialization, training or error recovery, and at least one of the ordered sets may include a lane identified.

Further aspects of the invention will be apparent from the Detailed Description of the Drawings.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

FIG. 6 shows three tables illustrating ordered sets used in a four lane implementation of the links in the systems of FIGS. 1 and 2;

DETAILED DESCRIPTION OF THE INVENTION

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 1:
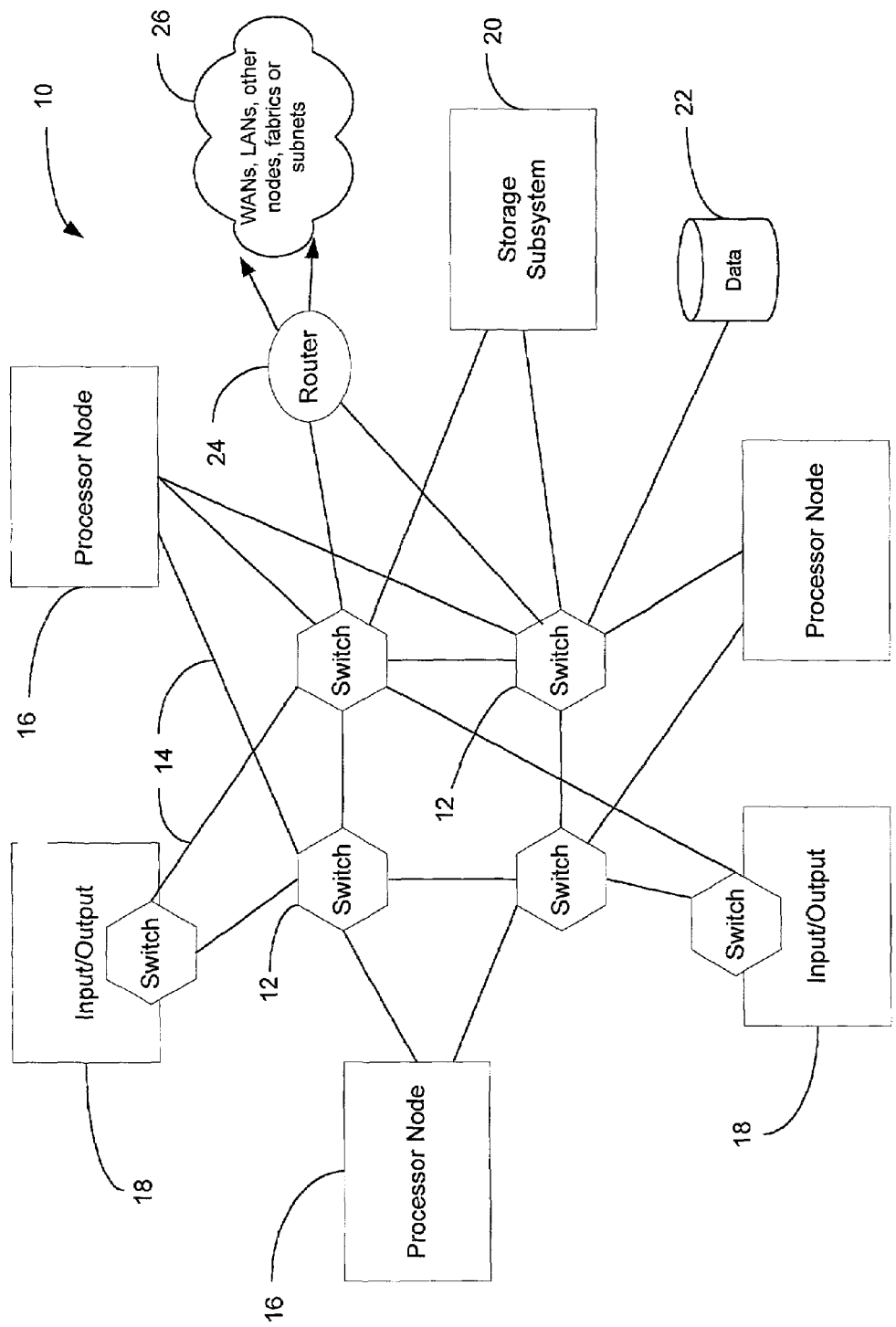
FIG. 1 is a schematic diagram showing a System Area Network embodying the invention.

Referring now to the figures, and in particular FIG. 1, shown is a System Area Network 10 incorporating the invention. The SAN 10 comprises a switch fabric 12 and a number of nodes interconnected by the switch fabric. The switch fabric is generally accepted to be the switches 12 and the interconnecting links 14, while the nodes can, for example, include processor nodes 16, I/O nodes 18, storage subsystems 20 (e.g. a redundant array of independent disk (RAID) system) or a storage device such as a hard drive 22. The switch fabric may also include routers 24 to provide a link to other wide or local area networks, other nodes, fabrics or subnets 26. When the SAN 10 forms part of a number of interconnected SANs, it is typically referred to as a subnet. The SAN nodes may attach to a single or multiple switches 12 and/or directly to one another.

Figure 2:
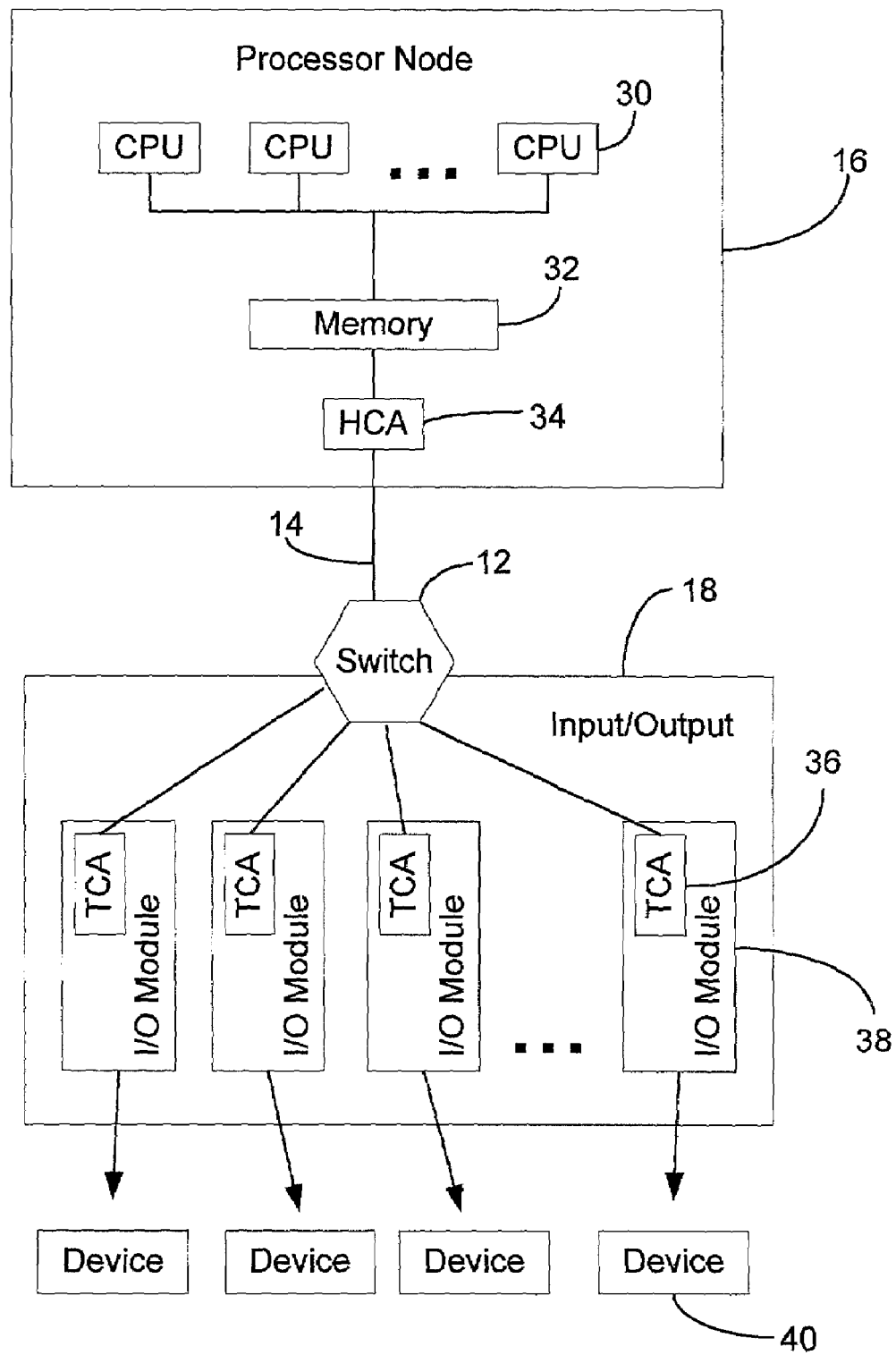
FIG. 2 is a schematic diagram showing a single processor node embodiment of the System Area Network of FIG. 1.

FIG. 2 shows a single processor implementation of a SAN, and also shows some of the nodes in more detail. As can be seen from the figure, a processor node 16 includes one or more central processing units (CPUs) 30, a memory 32, and a host channel adapter 34. The host channel adapter is the device that terminates the link 14 in processor nodes 16, it includes one or more ports, and is the interface between the link 14 and the processor node 16. Using the ISO/OSI model as a reference, the host channel adapter 34 provides the functionality of the transport, network, data-link and physical layers.

The I/O node 18 comprises a plurality of I/O modules 38 that are connected to the switch 12 by means of transfer channel adapters 36. As for the host channel adapters 34, the transfer channel adapters 36 include one or more ports, and are the interface between the I/O module and the switch 12. Using the ISO/OSI model as a reference, the transfer channel adapter 36 provides the functionality of the transport, network, data-link and physical layers. The I/O modules 38 in turn are each coupled to an I/O device 40.

Each link 14 in FIGS. 1 and 2 comprises one or more physical lanes (e.g. a copper backplane, a copper cable, a fiber optic cable or other transmission medium.) In embodiments of the SAN, each physical link is typically 1, 4 or 12 physical lanes wide, but of course the actual number of lanes may vary. The data streams on the lanes are encoded to remove DC offset, and to ensure a high density of signal transitions. In the illustrated embodiment, the industry standard 8B/10B encoding is used. The 8B/10B encoding scheme is disclosed in more detail in U.S. Pat. No. 4,486,739, the disclosure of which is incorporated herein by reference as if explicitly set forth.

For purposes of illustration, we will now consider a four lane implementation of the links 14 in the SAN 10. A description of a four lane implementation is being provided to show a specific exemplary implementation, and the application to different numbers of lanes can easily be appreciated after considering a four lane implementation.

Figure 3:
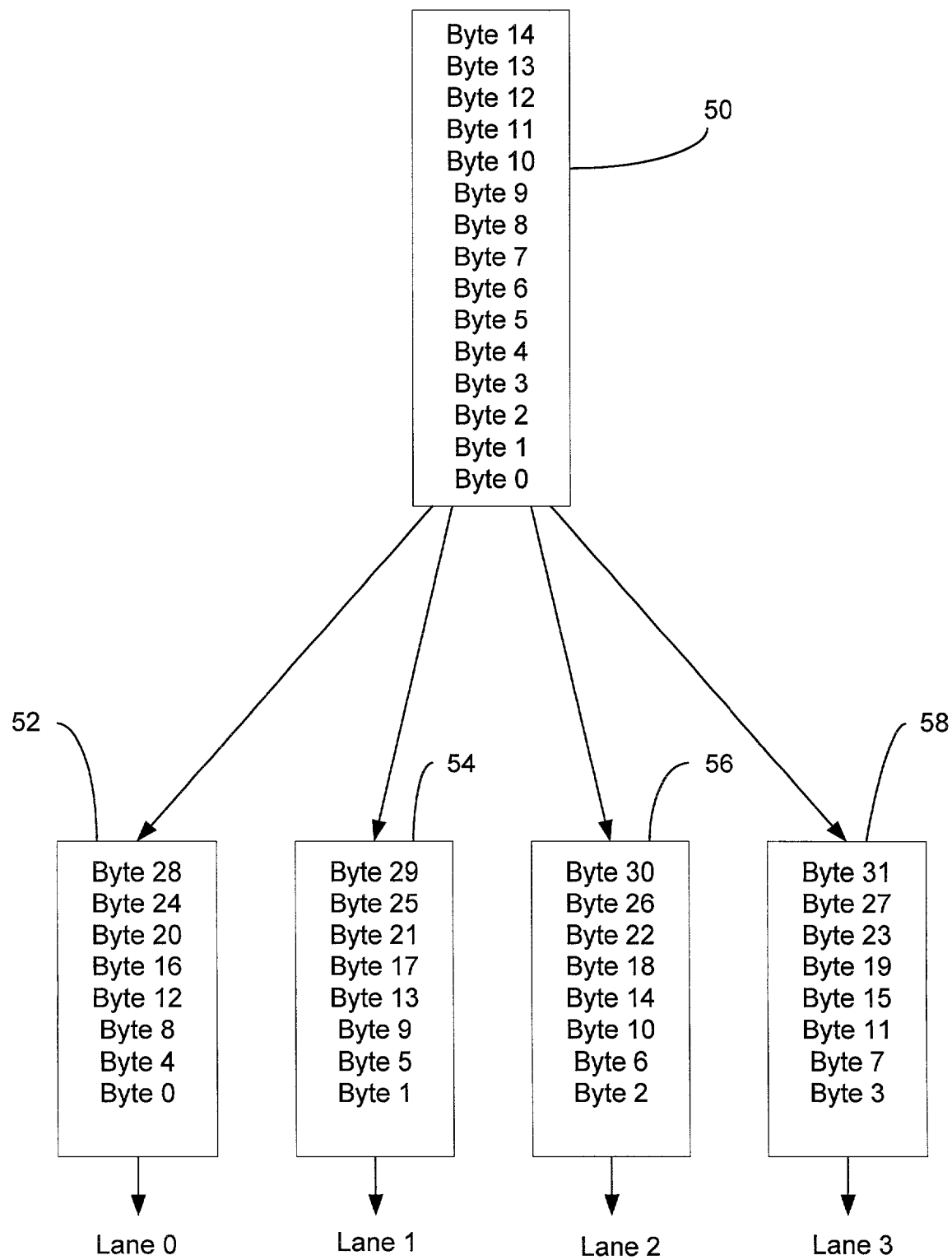
FIG. 3 is a schematic diagram showing byte-striping as it is applied to the systems of FIGS. 1 and 2.

Referring now to FIG. 3, data is transmitted onto the four lanes of a link 14 in a technique known as "byte striping." As can be seen from the figure, bytes in an output lane 50 are "striped" across the four lanes 52, 54, 56 and 58 by providing each successive byte to the next highest (or next lowest) lane number, with a return to the lowest (or highest) lane number (0) when the highest (or lowest) lane number (3) has been reached.

Figure 4:
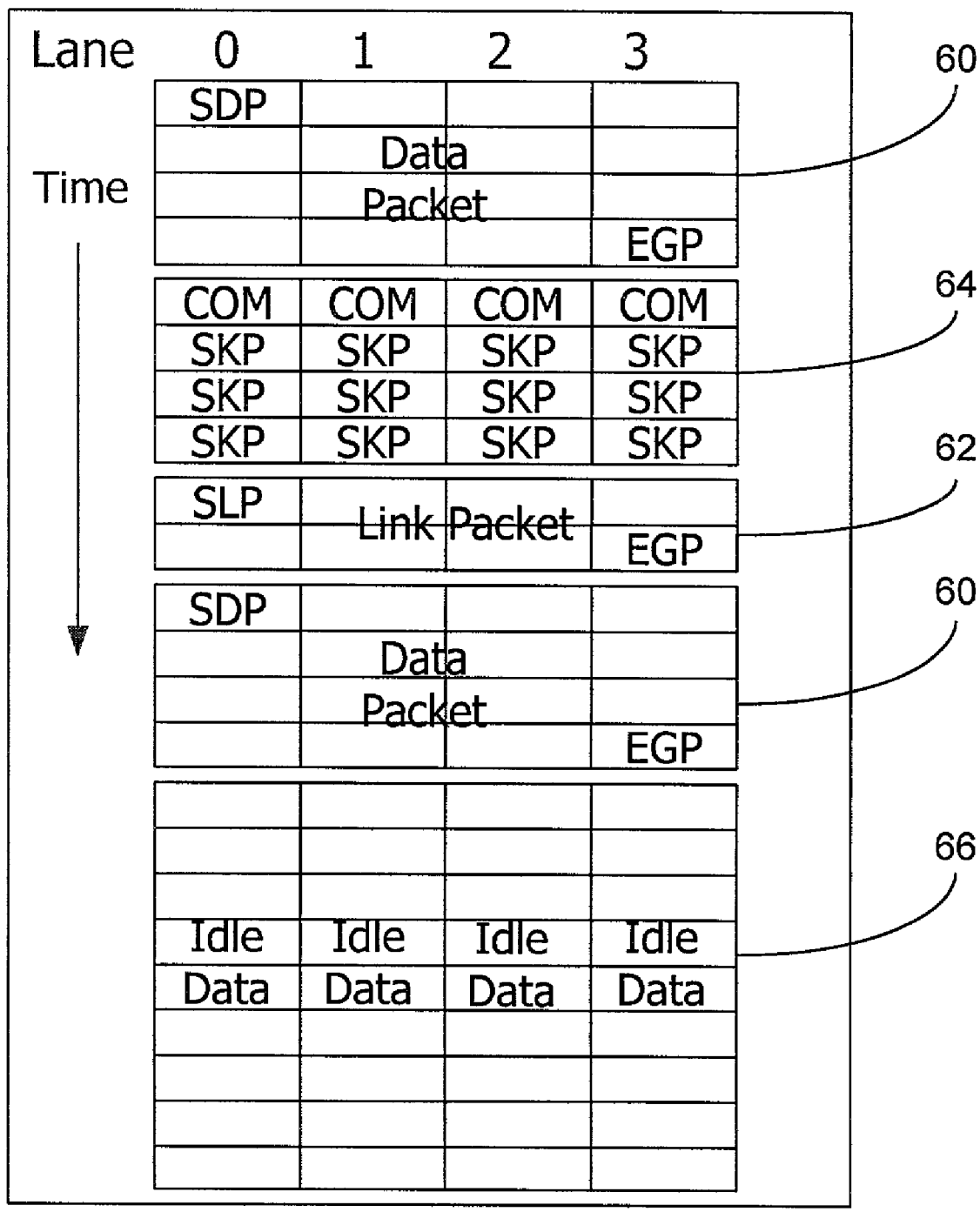
FIG. 4 is a table of exemplary data packets and ordered sets in a four lane implementation of the links in the systems of FIGS. 1 and 2.

Turning now to FIG. 4, the application of byte striping to data and link control packets can be seen. In the figure, the following symbols are used:

| | |
|---|---|
| COM | K28.5 — "Comma", a link control symbol |
| SDP | K27.7 — Start of Data Packet Delimiter |
| SLP | K28.2 — Start of Link Packet Delimiter |
| EGP | K29.7 — End of Good Packet Delimiter |
| EBP | K30.7 — End of Bad Packet Delimiter |
| PAD | K23.7 — Packet padding symbol |
| SKP | K28.0 — Skip symbol |

As can be seen from the figure, a data packet 60 commences with a SDP symbol in lane 0. The data packets are then striped across the lanes, with the data packet 60 ending in lane 3 with an EGP symbol. If the packet loses integrity in its transmission, and if the integrity loss is detected at an intermediate transmission node, the intermediate node will end the transmission with an EBP symbol. Data packets 60 in a four lane implementation are defined to be a multiple of four bytes long, to ensure that they end and start in lanes 0 and 3 respectively.

Similarly, a link packet 62 commences with a SLP symbol in lane 0. The link packets are then striped across the lanes, with the link packet 62 ending in lane 3 with an EGP symbol. Link packets 62 in a four lane implementation are defined to be a multiple of four bytes long, to ensure that they end and start in lanes 0 and 3 respectively.

Also shown in FIG. 4 is an ordered transmission set known as a skip ordered set 64. The skip ordered set is not byte striped across the lanes, but commences with a COM symbol in each lane, followed by a number of SKIP symbols. That is, skip ordered sets are transmitted on all lanes simultaneously. A skip ordered set is transmitted periodically on a link 14, and is used to permit nodes to perform clock tolerance compensation. At the receiving port, a skip ordered set 64 may be as short as two symbols (COM, SKIP) or as long as six symbols (COM, SKIP, SKIP, SKIP, SKIP, SKIP) in any one lane, permitting the addition or removal of two SKIP symbols in the illustrated embodiment. In the illustrated embodiment, skip ordered sets 64 are transmitted every 4608 clock cycles, but of course this number (as well as the number of SKIP symbols) may be varied according to the particular application.

Also shown in FIG. 4 is the use of idle data 66. The idle data is generated using a pseudo-random data pattern, and is used to fill the lanes of a link 14 that is up and functioning but idle. Link idle data is transmitted when no slip ordered sets are scheduled, and no link or data packets are available. The link idle data may by terminated at any time to send ordered sets, link or data packets, or other link communications. The link idle data may, for example, be generated by the linear shift feedback register $X^{11}+X^9+1$.

Figure 5:
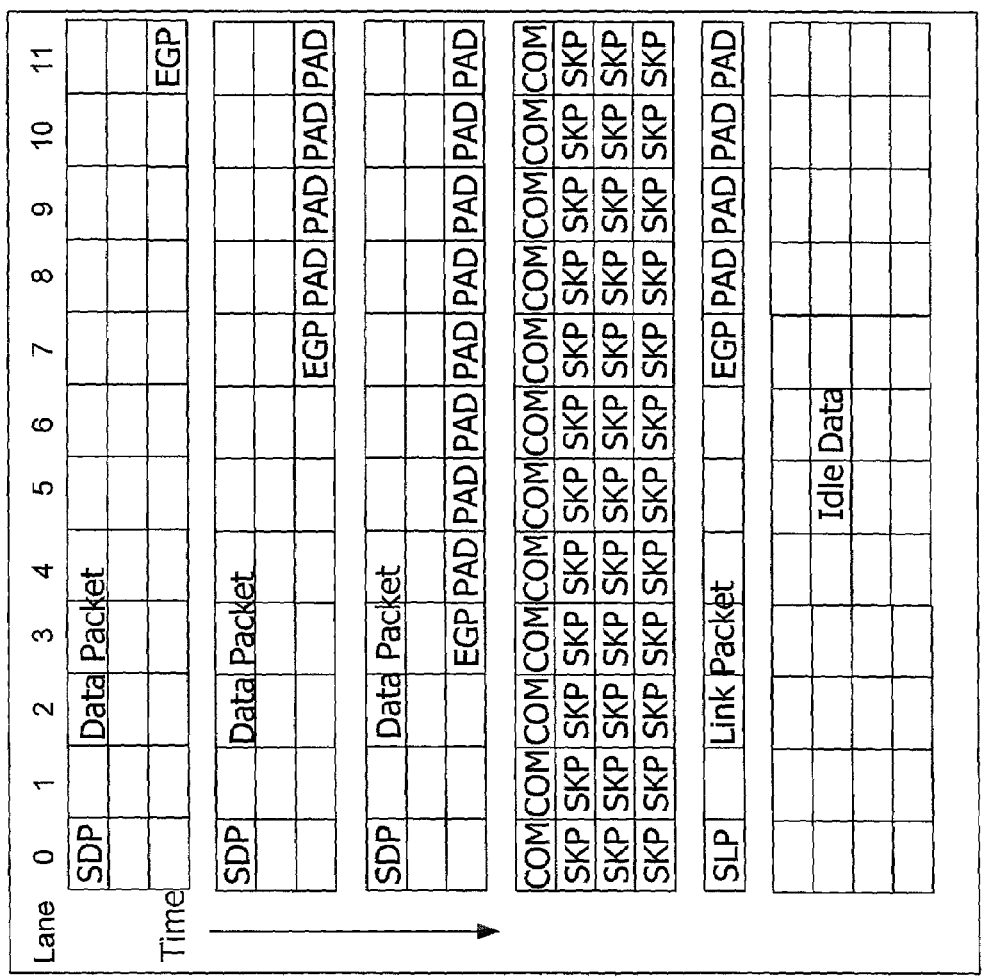
FIG. 5 is a table of exemplary data packets and ordered sets in a twelve lane implementation of the links in the systems of FIGS. 1 and 2.

FIG. 5 shows the application of this protocol to a twelve lane link, which illustrates how the protocol can be adapted when the number of bytes in a packet is not defined to be a multiple of the number of lanes. In this case, packets are defined to be four bytes long, but with the link being twelve lanes wide, the packets will not always end in lane 11, but may end in lanes 3 or 7 as well. When a data or link packet ends in lane 7 or 11, PAD symbols are used to fill the remaining positions in the row of bytes. Other than this modification, the application of the protocol to twelve lanes is the same as for four lanes.

FIG. 6 illustrates the format of three ordered sets for use in the protocol in a four lane application. In addition to the skip ordered set, which has been discussed above, TS1 and TS2 ordered sets are provided. The TS ordered sets are used for link initialization, configuration and training. As can be seen from the figure, each lane of the TS1 and TS2 ordered sets commence with a control symbol (the COM symbol in this example), followed by lane number data that identifies the lane on which the particular column should be received, followed by one or more data symbols (fourteen in the exemplary embodiment).

Link training is triggered when a port's receivers detect a TS1 ordered set on one or more of its links. In response, the port's transmitters send a repeated stream of TS1 ordered sets on all lanes. An appropriate delay is then provided to allow all receivers (at both the initiating and responding ports) to acquire symbol synchronization, which is the identification of a ten bit code group (symbols) within a serial bit stream. Symbol synch uses a fixed pattern found in comma symbols such as K28.5. Following the delay, receiver configuration begins.

During receiver configuration, link width is identified (i.e. the port receiving TS1 ordered sets on less than its number of lanes will configure itself to the lower number of lanes), lane polarity is checked and inverted lanes are optionally corrected, and lane order is checked as described in more detail below. When a port's receiver has completed its training and configuration, TS2 ordered sets are sent to indicate that the port is ready to receive data and link packets. When a port is both receiving and transmitting TS2 ordered sets, it can then transmit data and/or link packets as well as idle data. When a port is both transmitting and receiving packets or link data, then the link is up.

Figure 7:
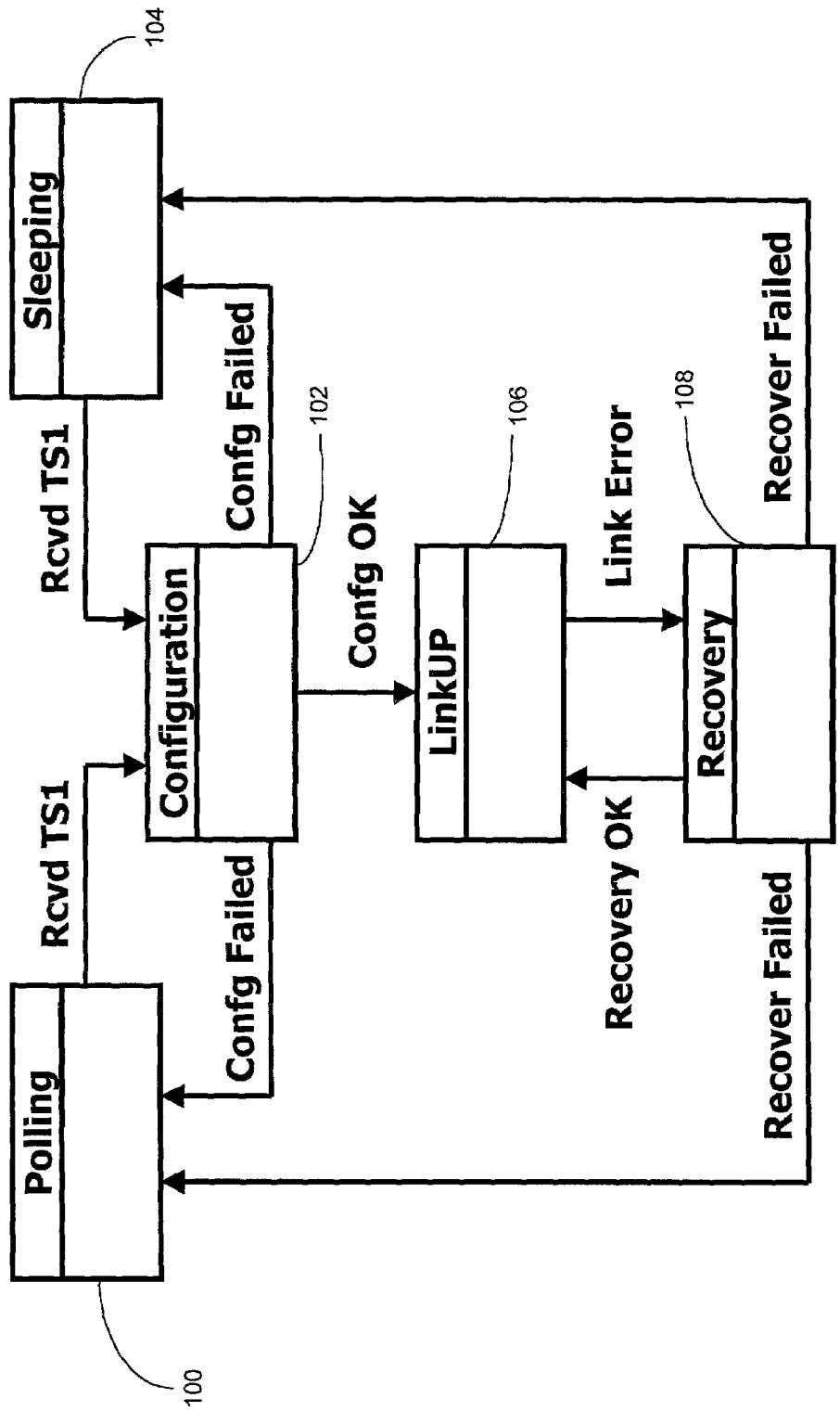
FIG. 7 is a state diagram for a link initialization, training and error recovery finite state machine used in the systems of FIGS. 1 and 2.

A link has two primary states, link up and link down. The link down state has five primary sub states: port disabled, port sleeping, port polling, port configuration and training, and link error recovery. As the name suggests, when a port in the disabled state it has been disabled by its channel adapter. From the disabled state, the port can, under control of its channel adapter, move into either the polling state or the sleeping state. The relationship between these two states and the remaining two states is shown in the state diagram shown in FIG. 7.

In the polling state 100, the port will be transmitting TS1 ordered sets. When it receives a TS1 in response, it will move into the configuration state 102. When the port is in the sleeping state 104, it is not transmitting anything, but will be moved into the configuration state 102 by the receipt of a TS1 ordered set. In the configuration state 102, the port will attempt to configure and train itself as described above. Should the attempted configuration fail, the port will return to either one of the sleeping or polling states, and the configuration failure is reported to and dealt with at a higher level in the architecture. If the port is successfully configured and trained, it will move into the link up state 106. In the link up state 106, the port receives and transmits data and link packets and idle data in normal operation. In the event of a link error, the port will move into the recovery state 108. The recovery state is essentially the same as the configuration state, and involves the retraining and reconfiguration of the link using TS1 and TS2 ordered sets as described above. If the port recovers successfully, it returns to the link up state 106. If the port recovery is unsuccessful, it returns to either the polling state 100 or the sleeping state 104.

The discussion of the system thusfar has considered operation of a protocol-aware higher level in the system architecture. The remaining figures illustrate embodiments of the protocol-unaware physical layer of the system architecture. At this level, the only responsibility of the components illustrated is to put the data on the physical transmission medium at one end and remove it at the other. Link training and configuration, error handling and recovery, and link status management are all done at a higher level in the architecture as discussed above with reference to FIGS. 1 to 7. An additional function that is performed at the protocol-unaware physical layer is the automatic alignment of the lanes as will be described in more detail below. Advantageously, the protocol-unaware physical layer takes advantage of the configuration and training and error recovery procedures of the protocol-aware higher level to perform the lane alignment.

Figure 8:
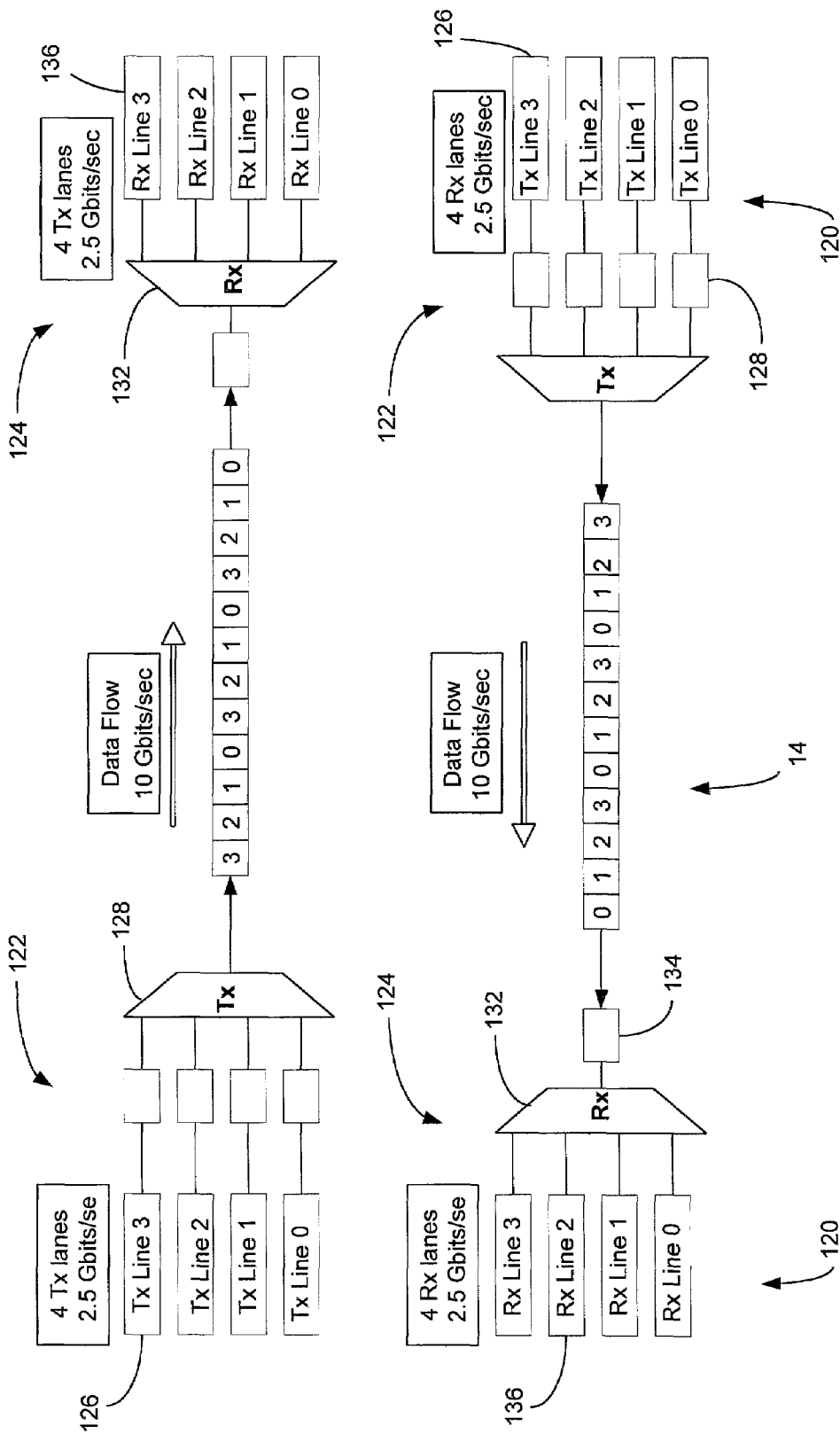
FIG. 8 is a schematic diagram illustrating transmitter and receiver modules and the links therebetween in a four lane implementation of the links in the systems of FIGS. 1 and 2.

FIG. 8 discloses a four lane implementation according to an aspect of the invention. In this implementation, at each end of a link 14 there is provided a transmitter/receiver module 120. The link itself is a fiber optic link, but other physical or wireless communications links may be used.

Each transmitter/receiver module 120 comprises a transmitter 122 and a receiver 124. Each transmitter 122 includes four transmitter lanes 126, four clock and data recovery modules 128, and a multiplexer 130. The clock and data recovery modules 128 convert a serial bit stream to a serial bit stream with a clock properly aligned to the data bit stream. Each receiver 124 comprises a demultiplexer 132, a clock and data recovery module 134 and four receive lanes 136.

The transmitter/receiver modules 120 operate at the bit level, in contrast to the protocol-aware logic described above with reference to FIGS. 1 to 7. That is, the multiplexer 130 receives bit-streams from each of the transmitter lanes 126. The multiplexer in turn time-division multiplexes the four bit streams onto the link 14. That is, one bit from each of the transmitter lanes 126 is placed consecutively on the link 14, generally in the order (or reverse order) of the lane number. For example, as shown in the diagram a lane 0 bit is placed on the line, followed by a lane 1 bit, followed by a lane 2 bit, followed by a lane 3 bit, followed by a lane 0 bit and so forth. Of course, the particular lane number and order of bit placement is not important, as long as the demultiplexer 132 at the receiving end uses the same order to extract the bits and place them on the four receive lanes 136.

Figure 9:
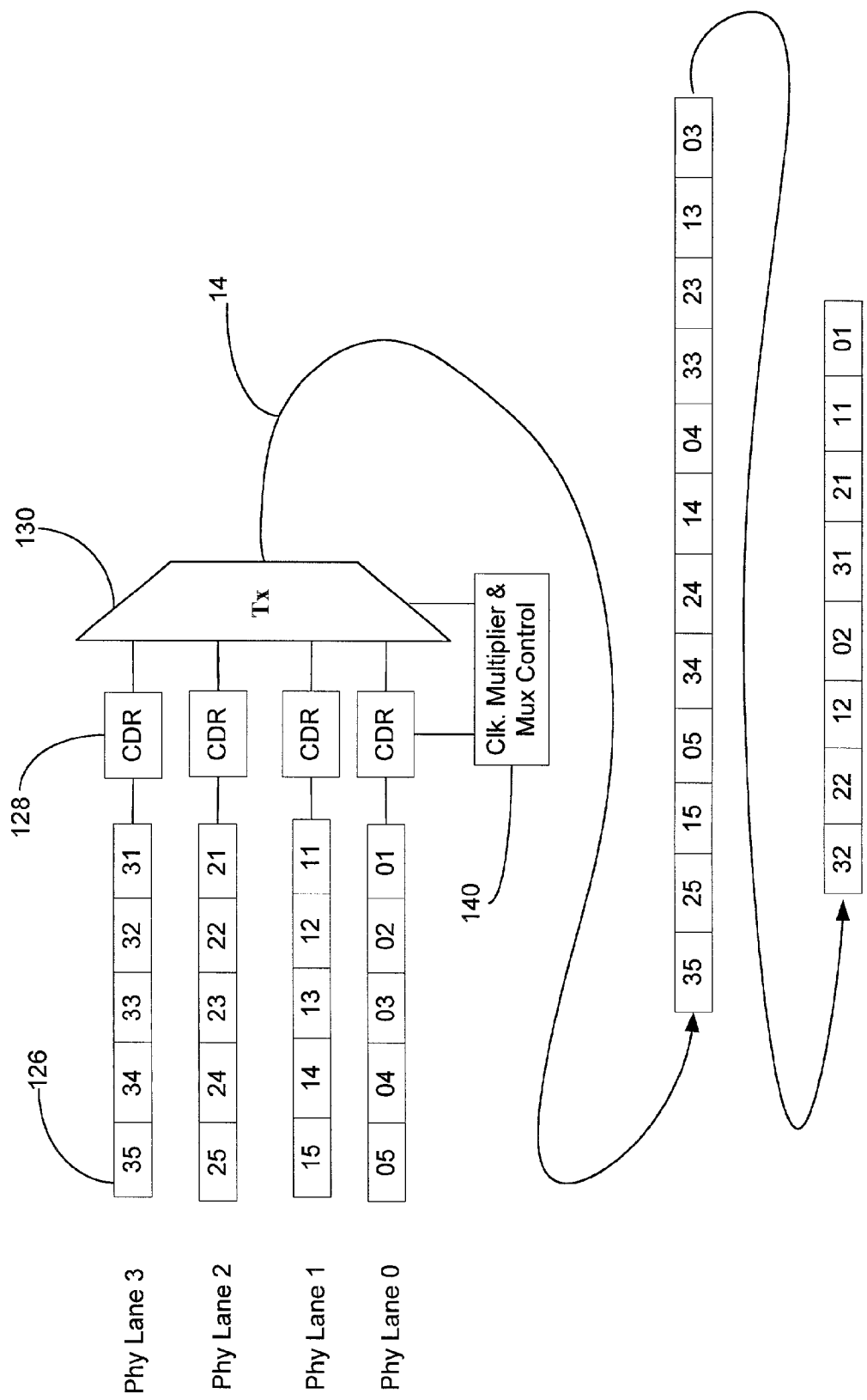
FIG. 9 is a schematic diagram illustrating the transmitter shown in FIG. 8, in more detail.

The transmitter 122 is shown in more detail in FIG. 9, which shows that the transmitter 122 includes a clock multiplier and multiplexer control 140. It will be appreciated that the data leaving the multiplexer 130 travels at a rate that is four times faster than an the individual lane. The multiplexer control 140 provides a clock signal that is four times quicker than the speed of the clock used for the individual lanes 126, and controls the multiplexer 130

Also shown schematically in FIG. 9 is the order in which bits are placed on the link 14 by the multiplexer 130. Using a two number representation to indicate lane and bit number (i.e. 32 is the third lane, second bit), we can see that the bits are placed on the link 14 as follows, first 01, then 11, then 21, 31, 02, 12 etc.

Figure 10:
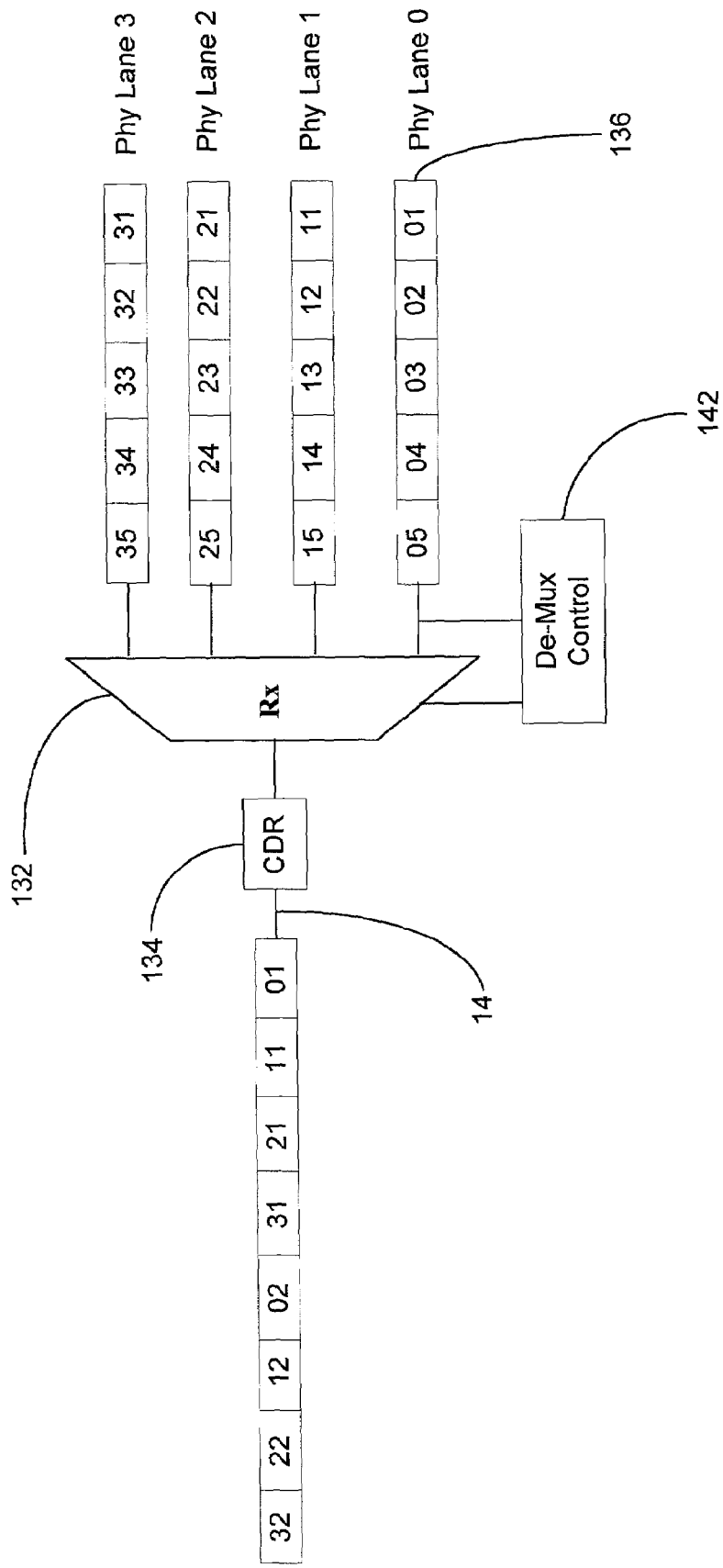
FIG. 10 is a schematic diagram illustrating the receiver shown in FIG. 8, in more detail.

FIG. 10 shows the receiver 124 in more detail. In addition to the demultiplexer 132, clock and data recovery module 134, the receiver 124 also includes a demultiplexer control 142. The demultiplexer control 142 includes a two bit counter and the finite state machine described in more detail below with reference to FIG. 11. The output of the counter is used as a select for the demultiplexer 132. The demultiplexer control 142 can block an increment of the counter to rotate the demultiplexed physical lanes 136. The demultiplexer control 142 monitors one of the lanes 126 for control symbols and lane identifiers as will be described in more detail below. The demultiplexer control 42 typically monitors lane 0, as this is the lane that is typically used if the link 14 configures itself to a one-lane configuration, but it is not required that lane 0 be monitored. Upon receiving the necessary control symbols and identifiers on the lane that it is monitoring, the demultiplexer control 142 can rotate the order in which bits coming off the line are assigned to lanes 126. That is, if the bits are being assigned to lanes 1, 2, 3, 0 respectively, and they should be assigned to lanes 0, 1, 2, 3 respectively, the demultiplexer can "rotate" the lane assignments one or more times to correct the lane assignments.

Also shown schematically in FIG. 10 is the order in which bits are removed from the link 14 by the demultiplexer 132. Using the same two number representation that was used for FIG. 9 to indicate lane and bit number (i.e. 32 is the third lane, second bit), we can see that the bits are removed from link 14 as follows, first 01, then 11, then 21, 31, 02, 12 etc. In this example, the lane assignments are correct and there is no need to rotate the lanes.

Figure 11:
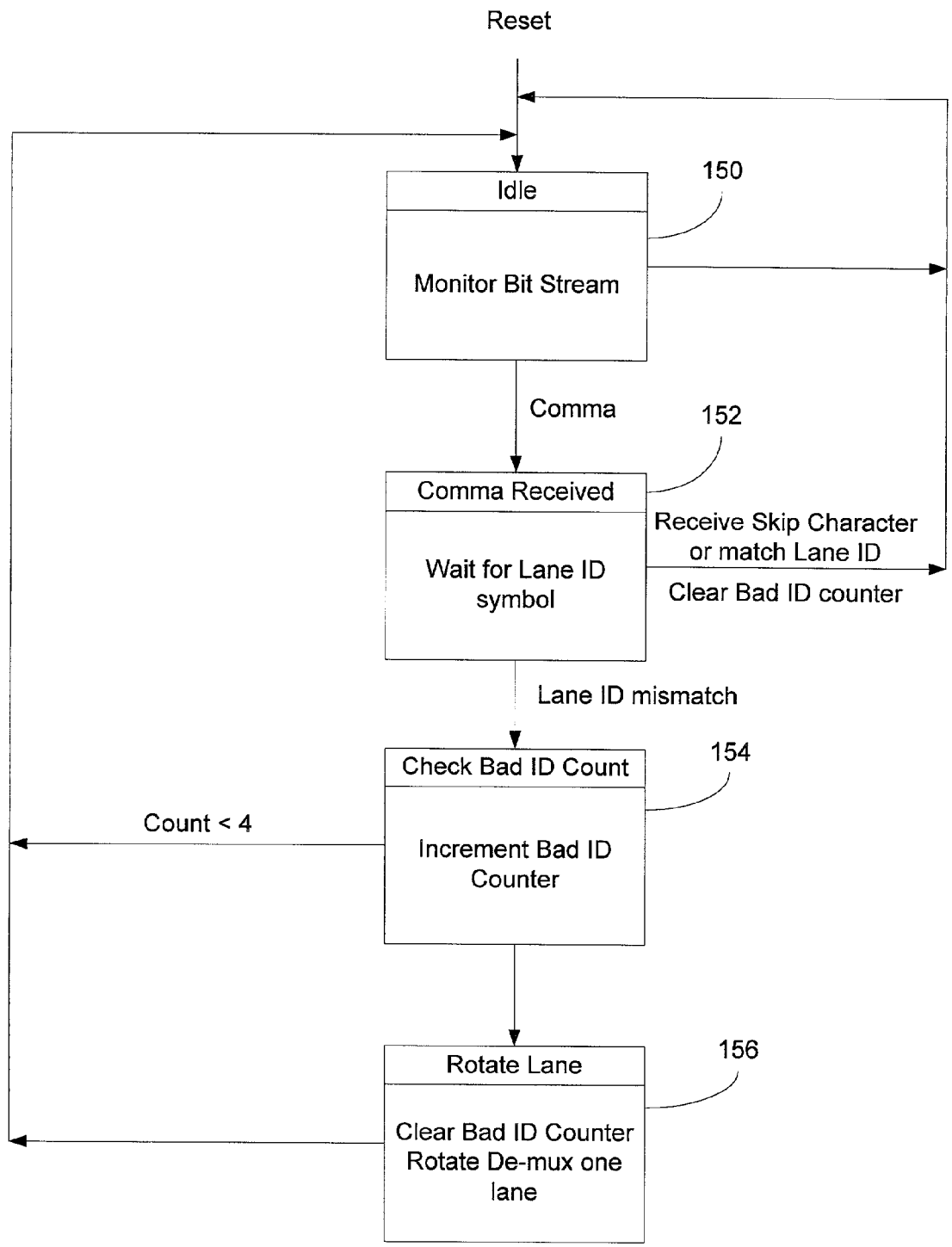
FIG. 11 is a state diagram for a finite state machine used to rotate lane assignments to their correct alignment in multiple lane implementations of the links in the systems of FIGS. 1 and 2.

The finite state machine used by the demultiplexer 132 to control the lane rotation is shown in FIG. 11. The finite state machine advantageously utilizes the link training and initialization and error recovery procedures that are described above to conduct lane rotation, although the system may be configured to include other specific characters and methods to permit lane rotation.

In particular, the lane rotation takes advantage of the transmission of the TS1 and TS2 ordered sets. A number of these ordered sets are transmitted on the lanes 126 at startup and upon error handling, and the demultiplexer control 142 utilizes the control symbol (comma) and associate lane identifier to align the lanes correctly. In fact, upon startup, the demultiplexer control can initially begin assigning bits to particular lanes without concern for the lane ID, and the finite state machine will in due course rotate the lane assignments to the correct lanes, allowing the link 14 to reach the link up state.

Turning now to FIG. 11, the demultiplexer control 142 after a reset, commences operation in the idle state 150. In this state, the demultiplexer control 142 monitors the bit stream on one of the lanes 136. If the appropriate control character ("comma" in this embodiment) is received in the bit stream, the demultiplexer control 142 moves into the control character (comma) received state 152.

In the control character received state 152, the demultiplexer control 142 monitors the bit stream for either a lane identifier symbol or another symbol that might be received after the applicable control symbol. In the current embodiment, the comma control symbol is only used to indicate the commencement of the TS1, TS2 and skip ordered sets. The TS1 and TS2 sets both include the lane identifier, while the skip ordered set does not. Accordingly, in the control character received state 152, the demultiplexer control 142 now waits for either a lane ID symbol, or the SKIP symbol, which indicates that the control symbol (comma) is being used for an alternative use. If the SKIP symbol is received, the demultiplexer control 142 returns to the idle state 150. If a lane identifier symbol is received, the demultiplexer control 142 checks the received lane identifier against the identity of the lane that the demultiplexer control is monitoring. If the received lane identifier symbol matches the monitored lane number, the demultiplexer control 142 returns to the idle state 150. If the received lane identifier symbol does not match the monitored lane number, the demultiplexer control 142 moves into the check bad ID count state 154.

The check bad ID count state 154 is provided to ensure that there is some tolerance of bad or corrupt data before the lanes are rotated. In the current embodiment, it is known that TS1 and TS2 ordered sets will be transmitted many times during link initialization or recovery, before the link reaches the link up state. Accordingly, initial lane identifier mismatches can be ignored before taking action to rotate the lanes as a result of the lane identifier symbol mismatch. If a number of mismatched lane identifier symbols are received, the lanes can be rotated with greater certainty that rotation is in fact required.

The check bad ID count state 154 increments a bad ID counter, and if the counter is less than a predefined amount (e.g. four), the demultiplexer control returns to the idle state 150. The predetermined amount may be varied according to the particular circumstances (e.g. expected number of ordered sets containing a lane identifier, the number of lanes, the maximum number of rotations required to correct a worse case scenario, the amount of false/corrupt/bad data expected etc.). In an alternative embodiment, the check counter may be eliminated altogether. If the bad ID counter is equal (or greater than) the predetermined amount, the demultiplexer control 142 moves into the rotate lane state 156.

In the rotate lane state 156, the bad ID counter is cleared, and the demultiplexer control 142 rotates the lane assignments by one lane. The demultiplexer control then returns to the idle state 150.

Upon returning to the idle state, the demultiplexer control 142 continues to monitor the bit stream. The demultiplexer control 142 will continue to go through the states as shown in FIG. 11 upon the receipt of the comma control symbol. If the lanes are still not aligned after the first rotation, further rotations will take place until the lane alignment is correct. If the lane alignment is disrupted, it will be reestablished upon link error recovery, when further comma control symbols and lane identifiers will be transmitted as discussed above.

Figure 12:
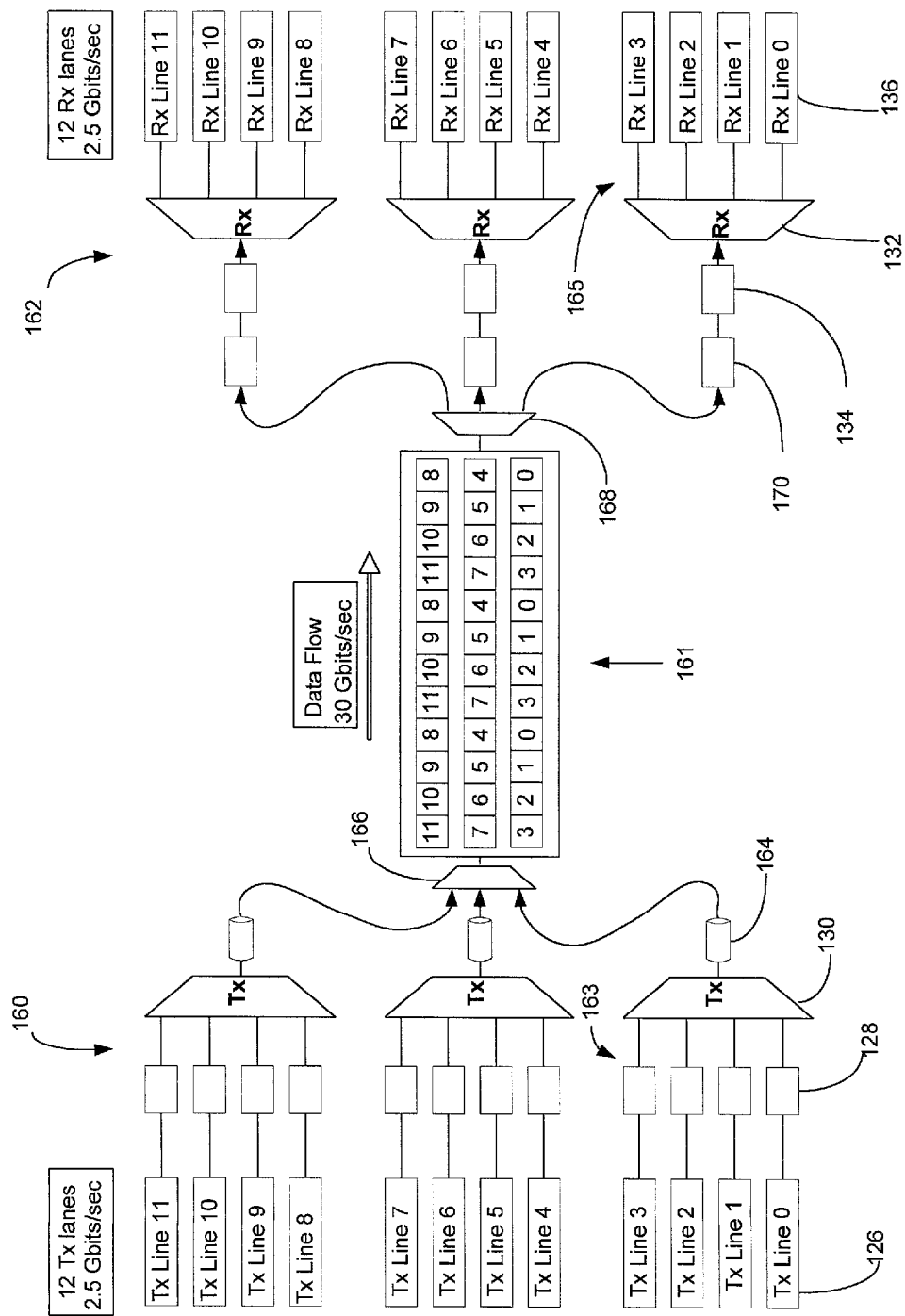
FIG. 12 is a schematic diagram illustrating a transmitter module and a receiver module and the links therebetween in a twelve lane implementation of the links in the systems of FIGS. 1 and 2.

A twelve lane embodiment of the invention is illustrated in FIG. 12. In this figure, only one transmission direction is shown, but it will be appreciated that (as for the four lane embodiment shown in FIG. 8), a symmetrical arrangement is typically provided for transmission in the reverse direction. As can be seen from the figure, transmission in one direction is accomplished by a transmitter module 160 and a receiver module 162, coupled by a fiber optic link 161.

Each transmitter module 160 comprises three transmitters 163, and each receiver module 162 comprises three receivers 165. Each transmitter 163 includes four transmitter lanes 126, four clock and data recovery modules 128, and a multiplexer 130. Each receiver 165 includes a demultiplexer 132, a clock and data recovery module 134 and four receive lanes 136. The functioning of the receivers 165 and transmitters 163 is the same as the functioning of the transmitters 122 and receivers 124 described above with reference to FIGS. 8 to 11, and for conciseness the description will not be repeated here, other than to summarize that each transmitter 163 time division multiplexes the bit streams of four transmitter lanes 126, while each receiver 165 receives a time division multiplexed bit stream that is demultiplexed onto the receiver's four receive lanes 136, and also to note that lane rotation within a corresponding transmitter 163/receiver 165 pair is accomplished using the state machine described with reference to FIG. 11 and its associated figures.

In addition to the structure described above, each transmitter 163 includes a laser diode 164 or other light (visible or non-visible) emitting device suitable for use in transmitting data over the fiber optic link 161. The laser diode 164 converts the electrical signal received from multiplexer 130 into an optical signal for transmission on fiber optic link 161. Notably, each transmitter 163 of the three transmitters that make up the transmitter module 160 has a laser diode 164 that operates on a different wavelength (and hence frequency) from the other two laser diodes 164. This difference permits the output from the three transmitters 163 to be transmitted together on the fiber optic link 161 in a technique known as wave division multiplexing. Accordingly, the embodiment of FIG. 12 provides for the wave division multiplexing of a plurality of time division multiplexed bit streams.

The output of each of the different-frequency laser diodes 164 are provided to an optical multiplexer 166. The optical multiplexer 166 combines these outputs for transmission on a single fiber optic link 161.

At the other end of the fiber optic link 161 there is provided an optical demultiplexer 168. The optical demultiplexer 168 separates the optical signal received on fiber optic link 161 into the three optical signals that were multiplexed onto the fiber optic link 161 by the optical multiplexer 166. Each receiver 165, in addition to the structure described above, includes a photo diode 170. Each photo diode 170 receives one of the corresponding demultiplexed signals from the optical demultiplexer 168, and converts it into an electrical signal that is then passed to the corresponding clock and data recovery module 134. Handling of the electrical signal and the data then proceeds as discussed above with reference to the FIG. 8 embodiment.

For the embodiment of FIG. 12, it is possible that lane rotation may be required as for the FIG. 8 embodiment. Notably however, this will only need to occur within a particular transmitter 163/receiver 165 pair. Since the wavelengths of the different laser diodes 164 are constant, and defined initially to correspond to a certain set of lanes 126, it should not be possible under normal circumstances for lanes to be misaligned outside their grouping of four lanes. That is, in FIG. 12, it should not be possible for Rx Lane 5 to be received on Rx Lane 1, because Rx lane 5 is transmitted from a laser diode 164 that has a frequency that will always be passed to the middle of the three receivers 165. That is, unlike the time division multiplexing within each set of four lanes, which can be misaligned within each set as a result of timing differences, the physical relationship between a particular transmitter 163/receiver 165 pairs is unlikely to be disturbed after initial setup.

In summary, during normal operation of the embodiment of FIGS. 8 to 10, data is byte-striped across the four transmission lanes 126. In the transmitter 122, the four lanes 126 across which the data has been byte-striped are, under control of the clock and data recovery modules 128 and the clock multiplier and multiplexer control 140 (FIG. 9), time division bit-multiplexed onto the link 14. The bit-multiplexed data stream on the link 14 is received in the receiver 124. In the receiver 124, the time division bit-multiplexed stream is demultiplexed onto the four receive lanes 136, thus reconstructing the byte-striped data transmission arrangement of the transmitter lanes 126.

At appropriate times, most notably during link initialization and training and during error recovery, one or more ordered sets comprising control characters are transmitted from the transmitter 122 to its corresponding receiver 124. The ordered sets are transmitted simultaneously (i.e. not byte-striped) on all transmit lanes 126, and, under control of the clock and data recovery modules 128 and the clock multiplier and multiplexer control 140 (FIG. 9), the ordered sets are time division bit-multiplexed across the link 14. The TS1 and TS2 ordered sets include a control character (COMMA) that indicates the start of an ordered set, followed by a lane identifier that is unique to each lane.

When the time division bit-multiplexed transmission including ordered sets is received at the receiver 124, the transmission is demultiplexed onto the four receive lanes 136. This is done by the demultiplexer 132 under control of the clock and data recovery module 134 and the demultiplexer control 142 (FIG. 10). The demultiplexing thus reconstructs the ordered sets as transmitted on each transmitter lane 126. As described in more detail with reference to FIG. 11, the demultiplexer control monitors one of the four receive lanes 136 for the occurrence of a control symbol followed by a lane number identifier, to ensure correct lane alignment. If an appropriate control symbol is not followed by a lane identifier, the demultiplexer control returns to monitoring the lane. If a control symbol and lane identifier are detected, the demultiplexer control 142 checks the received lane identifier against the number of the lane being monitored by the demultiplexer control 142. If the two are equal, the lane alignment is correct and no rotation is required. If the received lane identifier does not match the number of the lane being monitored, the demultiplexer control increments and checks the value of a bad ID counter. If the value of the bad ID counter is equal to or greater than a predetermined value, the lane assignment is rotated by one lane and the bad ID counter is reset. The demultiplexer control 142 then returns to monitoring the lane for receipt of a control symbol and a lane identifier. Upon further receipt of control symbols and lane ID numbers, the demultiplexer control 142 continues to check the received lane identifier, and increment and check the lane ID counter, and rotate the lanes as necessary.

In variations on this method, a bad ID counter is not provided and the lane is rotated immediately on receipt of a mismatched lane ID. A bad ID counter (up-counting or down-counting) is however preferred, to give improved tolerance for bad data. Also, the demultiplexer control may rotate the lanes by more than one lane, or might vary the direction in which lanes are rotated depending on the difference between the received lane identifier and the actual lane number. For example, if lane 0 is being monitored and a lane identifier of 3 is received, the lane may be rotated once in a "positive" direction to correct the lane assignment. Lane rotation is accomplished by adjusting the timing of the assignment of the lanes by the multiplexer.

To summarize further, during normal operation of the twelve lane embodiment of FIG. 12, data is byte-striped across the twelve transmission lanes 126. In the transmitter module 160, the twelve transmitter lanes 126 are divided into two or more groups of lanes, each group comprising two or more lanes. Each group of transmission lanes is then provided to a multiplexer 130, which, under control of the clock and data recovery modules 128 and the clock multiplier and multiplexer control 140 (FIG. 9), time division bit-multiplexes the lanes in each group. Each of the resulting bit streams (one bit stream for each group of lanes) is then provided to a laser diode 164, which converts the electrical signal into an optical signal. The laser diode for each group has a different transmission frequency, and the optical signals from the laser diodes 164 are provided to an optical multiplexer 166. The different-frequency optical signals are then combined in the optical multiplexer 166, to provide a wave-division multiplexed data stream comprising three bit-multiplexed data streams. The wave-division multiplexed data stream is transmitted across the fiber optic link 161 to the receiver module 162.

In the receiver module 162, the wave-division bit-multiplexed stream is first demultiplexed in the optical demultiplexer 168 into three bit-multiplexed optical streams, which are converted into electrical signals by the three photo diodes 170. The three bit-multiplexed streams are then provided to their corresponding demultiplexer 132, which demultiplexes each of the streams onto the three set of four receive lanes 136, thus reconstructing the twelve lane byte-striped data transmission arrangement of the transmitter lanes 126.

At appropriate times, most notably during link initialization and training and during error recovery, one or more ordered sets comprising control characters are transmitted from the transmitter module 160 to the receiver module 162. In particular, the TS1 and TS2 ordered sets include a control character (COMMA) that indicates the start of an ordered set, followed by a lane identifier that is unique to each lane. The ordered sets are transmitted simultaneously (i.e. not byte-striped) on all twelve transmit lanes 126, and, under control of the clock and data recovery modules 128 and the clock multiplier and multiplexer control 140 (FIG. 9), the ordered sets are time division bit-multiplexed in the same groups as for data transmission. Each of the resulting bit streams (one bit stream for each group of lanes) is then provided to a laser diode 164, which converts the electrical signal into an optical signal. The laser diode for each group has a different transmission frequency, and the optical signals from the laser diodes 164 are provided to an optical multiplexer 166. The different-frequency optical signals are then combined in the optical multiplexer 166, to provide a wave division multiplexed ordered set stream comprising three bit-multiplexed ordered set streams. The wave division multiplexed ordered set stream is transmitted across the fiber optic link 161 to the receiver module 162.

In the receiver module 162, the wave division bit-multiplexed stream is first demultiplexed in the optical demultiplexer 168 into three bit-multiplexed optical streams, which are converted into electrical signals by the three photo diodes 170. The three bit-multiplexed streams are then provided to their corresponding demultiplexer 132, which demultiplexes each of the streams onto the three sets of four receive lanes 136, thus reconstructing the twelve lane ordered set transmission arrangement of the transmitter lanes 126.

Within each of the three groups of four receive lanes 136, the demultiplexer control 142 (FIG. 10) monitors one of the four receive lanes 126 for the occurrence of a control symbol followed by a lane number identifier, to ensure correct lane alignment. If an appropriate control symbol is not followed by a lane identifier, the demultiplexer control returns to monitoring the lane. If a control symbol and lane identifier are detected, the demultiplexer control 142 checks the received lane identifier against the number of the lane being monitored by the demultiplexer control 142. If the two are equal, the lane alignment is correct and no rotation is required. If the received lane identifier does not match the number of the lane being monitored, the demultiplexer control increments and checks the value of a bad ID counter. If the value of the bad ID counter is equal to or greater than a predetermined value, the lane assignment is rotated by one lane and the bad ID counter is reset. The demultiplexer control 142 then returns to monitoring the lane for receipt of a control symbol and a lane identifier. Upon further receipt of control symbols and lane ID numbers, the demultiplexer control 142 continues to check the received lane identifier, and increment and check the lane ID counter, and rotate the lanes as necessary.

In the embodiment of FIG. 12, the actual lane rotation procedure for each demultiplexer 132 is the same as for the FIG. 8 embodiment, and the same variations are contemplated.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only.

What is claimed is:

1. A method of aligning a plurality of transmission lanes with a plurality of reception lanes in a data transmission system, comprising:
   transmitting a plurality of control symbols and lane identifiers on each of the transmission lanes;
   time-division multiplexing the control symbols and lane identifiers onto a data link;
   demultiplexing the control symbols and lane identifiers onto the plurality of reception lanes;
   monitoring one of the reception lanes for a control symbol;
   upon receipt of a control symbol, awaiting receipt of a lane identifier;
   upon receipt of a lane identifier, comparing the received lane identifier with the identity of the reception lane being monitored; and
   rotating a lane assignment if the received lane identifier does not match the identity of the reception lane being monitored.

2. The method of claim 1 further comprising:
   incrementing a bad lane identifier if the received lane identifier does not match the identity of the reception lane being scanned; and
   wherein the step of rotating the lane assignment is conducted only if the bad lane identifier reaches a predetermined number.

3. The method of claim 2 further comprising:
   resetting the bad lane identifier after rotating the lane assignment.

4. The method of claim 2 further comprising:
   returning to monitoring the lane without rotating the lane assignment if, after incrementing, the bad lane identifier has not reached the predetermined number.

5. A method of aligning a plurality of transmission lanes with a plurality of reception lanes in a data transmission system, comprising
   conducting link intialization or error recovery at a protocol-aware higher level of the architecture of the data transmission system, the link initialization or error recovery including the transmission of a plurality of ordered sets, at least one of the ordered sets including lane identifiers;
   conducting link alignment at a protocol-unaware lower level in the architecture of the data transmission system, wherein the link alignment comprises the steps of:
   receiving an ordered set on the plurality of reception lanes, the ordered set being transmitted by the protocol-aware higher level in accordance with a protocol associated with the higher level;
   comparing a received lane identifier associated with the ordered set with an identity of a reception lane; and
   rotating a lane assignment if the identity of the reception lane does not match the received lane identifier.

6. The method of claim 5 further comprising:
   incrementing a bad lane identifier if the identity of the reception lane does not match the received lane identifier; and
   wherein the step of rotating the lane assignment is conducted only if the bad lane identifier reaches a predetermined number.

7. The method of claim 6 further comprising:
   resetting the bad lane identifier after rotating the lane assignment.

8. The method of claim 6 further comprising:
   returning to monitoring the lane without rotating the lane assignment if, after incrementing, the bad lane identifier has not reached the predetermined number.

9. A method of conducting lane alignment comprising the steps of:
   transmitting data on a plurality of transmission lanes by byte-striping the data across the transmission lanes;
   time-division multiplexing the byte-striped data on the transmission lanes onto a data link;
   transmitting a set of control symbols and lane identifiers in parallel on the transmission lanes;
   time-division multiplexing the control symbols and lane identifiers on the transmission lanes onto the data link;
   demultiplexing the time-division multiplexed byte-striped data onto a plurality of reception lanes;
   demultiplexing the time-division multiplexed control symbols and lane identifiers onto the reception lanes;
   monitoring one of the reception lanes for a control symbol and lane identifier;
   comparing a received lane identifier with an identity of the lane being monitored; and
   rotating a lane assignment if the lane identifier does not match the identity of the lane being monitored.

10. The method of claim 9 further comprising:
    incrementing a bad lane identifier if the identity of the lane that is being monitored does not match the received lane identifier; and
    wherein the step of rotating the lane assignment is conducted only if the bad lane identifier reaches a predetermined number.

11. The method of claim 10 further comprising:
    resetting the bad lane identifier after rotating the lane assignment.

12. The method of claim 10 further comprising:
    returning to monitoring the lane without rotating the lane assignment if, after incrementing, the bad lane identifier has not reached the predetermined number.

13. A computer network device comprising:
    a plurality of time-division multiplexers to generate a plurality of transmitted time-division multiplexed signals;
    a plurality of time-division demultiplexers to demultiplex a plurality of received time division multiplexed signals onto a plurality of sets of receive lanes; and
    a control module for monitoring a receive lane, the control module in use:
    monitoring the monitored receive lane for receipt of a lane identifier;
    comparing a received lane identifier with an identity of the monitored receive lane; and rotating a lane assignment within the set of receive lanes that includes the monitored lane if the received lane identifier does not match the identity of the monitored receive lane.

14. The computer network device of claim 13 wherein the control module increments a bad lane identifier if the received lane identifier does not match the identity of the monitored receive lane; and wherein the rotation of the lane assignment is conducted only if the bad lane identifier reaches a predetermined value.

15. The computer network device of claim 14 wherein the control module resets the bad lane identifier after rotating the lane assignment.

16. The computer network device of claim 14 wherein the control module returns to monitoring the monitored receive lane without rotating the lane assignment if, after incrementing, the bad lane identifier has not reached the predetermined value.

17. The computer network device of claim 13 wherein the plurality of time-division multiplexers in use receive data that is byte streamed and control and identifier symbols that are transmitted in parallel.

18. The computer network device of claim 17 wherein the plurality of time-division multiplexers conduct time-division multiplexing at a bit level.

19. The computer network device of claim 13 wherein the control module operates at a protocol-unaware level of the computer network device, and wherein control and lane identifier symbols are transmitted by a protocol-aware level of the computer network device.

20. The computer network device of claim 19 wherein the protocol-aware level of the computer device operates on an Infiniband protocol.

21. The computer network device of claim 20 wherein the control module in use monitors the monitored receive lane for receipt of a COMMA control symbol.

22. The computer network device of claim 21 wherein the control module in use returns to monitoring the monitored receive lane if a lane identifier is not received after the COMMA control symbol.

23. The computer network device of claim 20 wherein in use a plurality of ordered sets are transmitted by the protocol-aware level upon link initialization, training or error recovery, at least one of the ordered sets including a lane identifier.

* * * * *

UNITED STATES PATENT AND TRADEMARK OFFICE
CERTIFICATE OF CORRECTION

PATENT NO. : 6,985,502 B2  
APPLICATION NO. : 09/989911  
DATED : January 10, 2006  
INVENTOR(S) : William P. Bunton Page 1 of 1

It is certified that error appears in the above-identified patent and that said Letters Patent is hereby corrected as shown below:

In column 3, line 19, delete "identified." and insert -- identifier. --, therefor.

In column 5, line 54, delete "slip" and insert -- skip --, therefor.

In column 5, line 56, delete "by" and insert -- be --, therefor.

In column 11, line 51, delete "assignment." and insert -- assignment, or rotated three times in a "negative" direction to correct the lane assignment. --, therefor.

Signed and Sealed this

Fourth Day of August, 2009

JOHN DOLL  
*Acting Director of the United States Patent and Trademark Office*